(12) United States Patent
Sauder et al.

(10) Patent No.: US 11,690,310 B2
(45) Date of Patent: *Jul. 4, 2023

(54) SYSTEMS AND METHOD FOR MONITORING, CONTROLLING, AND DISPLAYING FIELD OPERATIONS

(71) Applicant: CLIMATE LLC, Saint Louis, MO (US)

(72) Inventors: Doug Sauder, Livermore, CA (US); Ryan Allgaier, East Peoria, IL (US); Phil D. Baurer, Tremont, IL (US)

(73) Assignee: CLIMATE LLC, Saint Louis, MO (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/194,130

(22) Filed: Mar. 5, 2021

(65) Prior Publication Data
US 2021/0212251 A1 Jul. 15, 2021

Related U.S. Application Data

(63) Continuation of application No. 16/529,487, filed on Aug. 1, 2019, now Pat. No. 10,939,608, which is a
(Continued)

(51) Int. Cl.
*A01D 34/00* (2006.01)
*A01C 7/10* (2006.01)
(Continued)

(52) U.S. Cl.
CPC ............ *A01C 7/102* (2013.01); *A01B 79/005* (2013.01); *A01D 91/04* (2013.01); *B60K 35/00* (2013.01);
(Continued)

(58) Field of Classification Search
CPC ...... A01B 79/005; A01C 7/102; A01D 91/04; B60K 2350/352; B60K 35/00
(Continued)

(56) References Cited

U.S. PATENT DOCUMENTS 9,345,189 B2 5/2016 Harmelink
9,464,905 B2 * 10/2016 Lewis ...................... H04L 9/14
(Continued)

*Primary Examiner* — Dalena Tran
(74) *Attorney, Agent, or Firm* — Harness, Dickey & Pierce, P.L.C.

(57) ABSTRACT

Described herein are systems and method for monitoring and controlling field operations including planting and harvesting operations. In one embodiment, a data processing system of a machine includes a data transfer and processing module that communicates bi-directionally with different types of controllers and sensors mounted on the machine or an implement attached to the machine. The data transfer and processing module is configured to execute instructions to receive signals from these controllers and sensors, process these signals, and generate data for monitoring and controlling field operations of the machine. At least one display device is coupled to the data transfer and processing module. The at least one display device displays the data for monitoring and controlling field operations of the machine or implement to a user or operator.

20 Claims, 7 Drawing Sheets

Related U.S. Application Data continuation of application No. 15/662,023, filed on Jul. 27, 2017, now Pat. No. 10,383,275, which is a continuation of application No. 14/819,363, filed on Aug. 5, 2015, now Pat. No. 9,717,178.

(60) Provisional application No. 62/082,480, filed on Nov. 20, 2014, provisional application No. 62/035,321, filed on Aug. 8, 2014.

(51) Int. Cl.
*B60K 35/00* (2006.01)
*A01B 79/00* (2006.01)
*A01D 91/04* (2006.01)

(52) U.S. Cl.
CPC ...... *B60K 2370/16* (2019.05); *B60K 2370/52* (2019.05)

(58) Field of Classification Search
USPC ..... 701/1, 50, 32.7; 700/17, 230; 340/12.22, 340/13.24, 3.7; 455/345
See application file for complete search history.

(56) References Cited

U.S. PATENT DOCUMENTS

| | | | |
|---|---|---|---|
| 9,506,223 B2 * | 11/2016 | Jinbo | E02F 9/26 |
| 9,557,278 B1 | 1/2017 | Itagi | |
| 9,999,173 B2 | 6/2018 | Assy | |
| 10,074,984 B2 * | 9/2018 | Maruhashi | H02J 3/28 |
| 10,286,920 B2 * | 5/2019 | Mayer | B60K 37/06 |
| 11,173,996 B2 * | 11/2021 | Salmon | B63B 17/00 |
| 2003/0159631 A1 | 8/2003 | Sauder | |

* cited by examiner

SYSTEMS AND METHOD FOR MONITORING, CONTROLLING, AND DISPLAYING FIELD OPERATIONS

BENEFIT CLAIM

This application claims the benefit under 35 U.S.C. § 120 as a continuation of application Ser. No. 16/529,487, filed Aug. 1, 2019, which claims the benefit under 35 U.S.C. § 120 as a continuation of application Ser. No. 15/662,023, filed Jul. 27, 2017, now U.S. Pat. No. 10,383,275, which claims the benefit under 35 U.S.C. § 120 as a continuation of application Ser. No. 14/819,363, filed Aug. 5, 2015, now U.S. Pat. No. 9,717,178, issued Aug. 1, 2017, which claims the benefit under 35 U.S.C. § 119(e) of provisional application 62/082,480, filed Nov. 20, 2014, and claims the benefit under 35 U.S.C. § 119(e) of provisional application 62/035,321, filed Aug. 8, 2014, entire contents of all applications are hereby incorporated herein by reference for all purposes as if fully set forth herein. The applicant(s) hereby rescind any disclaimer of claim scope in the parent application(s) or the prosecution history thereof and advise the USPTO that the claims in this application may be broader than any claim in the parent applications.

TECHNICAL FIELD

Embodiments of the present invention relate to systems and method for monitoring, controlling, and displaying field operations (e.g., planting and harvesting operations).

BACKGROUND

Planters are used for planting crops (e.g., corn, soybeans) in a field. Some planters include a display monitor within a cab for displaying a coverage map that shows regions of the field that have been planted. The coverage map of the planter is generated based on planting data collected by the planter. Swath control prevents the planter from planting in a region that has already been planted by the same planter.

A combine harvester or combine is a machine that harvests crops. A coverage map of a combine displays regions of the field that have been harvested by that combine. A coverage map allows the operator of the combine know that a region of the field has already been harvested by the same combine. The operator may have difficulty operating the machine, operating the implement, and analyzing the data and maps provided by the display monitor in a timely manner.

SUMMARY

Described herein are systems and method for monitoring and controlling field operations including planting and harvesting operations. In one embodiment, a system for monitoring and controlling an agricultural implement includes a data transfer and processing module, a first connector configured to communicate with a plurality of implement sensors and to receive sensor data from the plurality of implement sensors, and a second connector configured to communicate bi-directionally with a plurality of implement controllers. The system also includes a first port configured to communicate bi-directionally with a first display device, a second port configured to communicate with a second display device, and a processing system that is coupled to the first connector, the second connector, the first port, and the second port. The processing system is configured to process sensor data received from said plurality of implement sensors. The processing system is also configured to generate and transfer command signals to said plurality of implement controllers. The processing system may also be configured to generate display data useable by said first and second display devices.

BRIEF DESCRIPTION OF THE DRAWINGS

The present invention is illustrated by way of example, and not by way of limitation, in the figures of the accompanying drawings and in which.

DETAILED DESCRIPTION

Described herein are systems and method for monitoring and controlling field operations including planting and harvesting operations. In one embodiment, a data processing system of a machine includes a data transfer and processing module that includes at least one microcontroller and a processor. The at least one microcontroller and the processor communicate bi-directionally with different types of controllers and sensors mounted on the machine or an implement attached to the machine. The controllers and sensors may include those described in U.S. patent application Ser. No. 14/562,400 (pub. no. US20150094916 A1), hereby incorporated by reference herein in its entirety. The at least one microcontroller and the processor are configured to execute instructions to receive signals from these controllers and sensors, process these signals, and generate data for monitoring and controlling field operations of the machine. At least one display device is coupled to the data transfer and processing module. The at least one display device displays the data for monitoring and controlling field operations of the machine or implement to a user or operator.

Embodiments of the invention provide improved systems and method for monitoring and controlling field operations. An operator can more easily interact with a first display device (e.g., a tablet device) and a second display device (e.g., an OEM display device) and analyze data provided by these display devices while operating the machine and possible implement. The operator can also remove the first display device (e.g., a tablet device, a computing device) after finishing in-field operations and review data and images with the first display device at a different location (e.g., farm, home) than the location (e.g., field) where the data is acquired.

In the following description, numerous details are set forth. It will be apparent, however, to one skilled in the art, that embodiments of the present invention may be practiced without these specific details. In some instances, well-known structures and devices are shown in block diagram form, rather than in detail, in order to avoid obscuring embodiments of the present invention.

Figure 1:
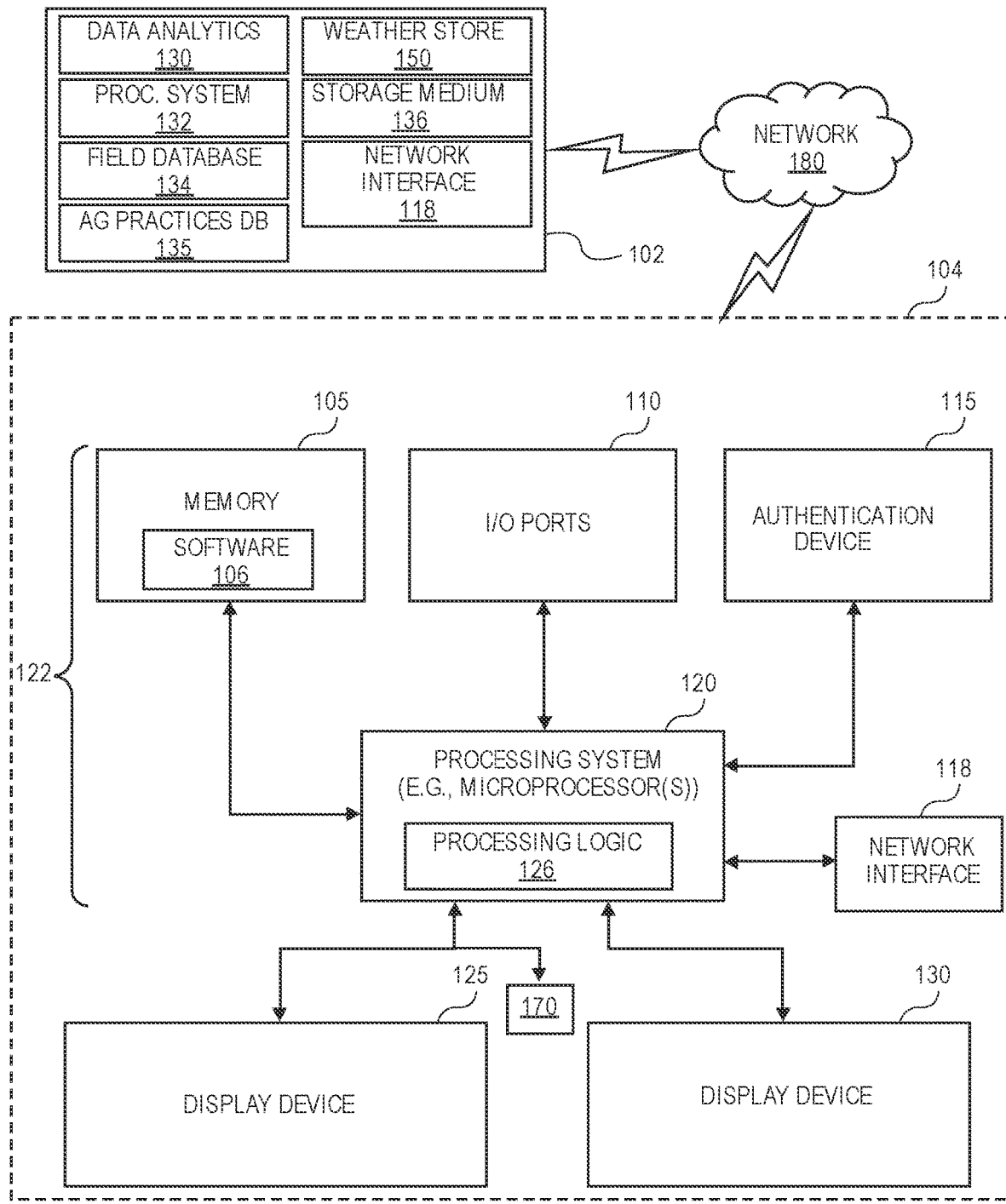
FIG. 1 shows an example of a system for monitoring, controlling, and displaying field operations in accordance with one embodiment.

FIG. 1 shows an example of a system for monitoring, controlling, and displaying field operations in accordance with one embodiment. For example, and in one embodiment, the system 100 may be implemented as a cloud based system with servers, data processing devices, computers, etc. Aspects, features, and functionality of the system 100 can be implemented in servers, planters, planter monitors, combines, laptops, tablets, computer terminals, client devices, user devices, handheld computers, personal digital assistants, cellular telephones, cameras, smart phones, mobile phones, computing devices, or a combination of any of these or other data processing devices.

The system 100 (e.g., cloud based system) for monitoring, controlling, and displaying field operations may include an agricultural analysis system 102 that includes a weather store 150 with current and historical weather data and at least one processing system 132 for executing instructions for performing agricultural data analysis. The storage medium 136 may store instructions, software, software programs, etc. for execution by the processing system and for performing operations of the agricultural analysis system 102. A data analytics module 130 may perform analytics on agricultural data (e.g., weather, field, yield, etc.) to generate predictions and correlations relating to agricultural operations. For example, the correlations may relate yield (e.g., crop yield) to agricultural variables (e.g., ambient weather conditions, field conditions, agriculture practices information, input cost information, commodity price information, proprietary indices, etc.).

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., as-applied planting information, fertilization information, planting population, applied nutrients (e.g., nitrogen), yield levels, proprietary indices (e.g., ratio of seed population to a soil parameter), etc.) for the fields that are being monitored by the system 100.

In one embodiment, the processing system is configured to execute instructions to monitor agricultural data including yield, ambient weather conditions, field information, farming practice information, input cost information, and commodity price information. The system 100 shown in FIG. 1 may include a network interface 118 for communicating with other systems or devices such as data processing system 104 (e.g., machines, planters, combines, etc.), weather devices, and user devices via a network 180 (e.g., Internet, wide area network, WiMax, satellite, cellular, IP network, etc.). The network interface includes one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for monitoring and controlling field operations or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

The system 100 includes a data processing system 104 (e.g., data processing system of a machine, data processing system of a planter, data processing system of a combine, etc.) in accordance with one embodiment. For example and in one embodiment, the system may be implemented as a data processing device such as a desktop computer, server, cloud based system, planter, planter monitor, combine, laptop, tablet, computer terminal, a handheld computer, a personal digital assistant, a cellular telephone, a camera, a smart phone, mobile phone, an email device, or a combination of any of these or other data processing devices.

In other embodiments, the data processing system may be a network computer or an embedded processing device within another device (e.g., display device) or within a machine (e.g., planter, combine), or other types of data processing system having fewer components or perhaps more components than that shown in FIG. 1.

The data processing system 104 shown in FIG. 1 includes a data transfer and processing module 122 that includes a processing system 120, memory 105, input/output (I/O) ports 110, an authentication device 115 for authentication between the data transfer and processing module 122 and a display device 125, and an optional network interface 118 for communicating with other systems or devices (e.g., cloud-based source, agricultural analysis system 102, weather device, user device, etc.). The network interface can be a GPS transceiver, a WLAN transceiver (e.g., WiFi), an infrared transceiver, a Bluetooth transceiver, a wireless cellular telephony transceiver, Ethernet, or other. The I/O ports 110 enable communication with another data processing system or device (e.g., display devices, sensors, etc.).

The processing system 120 may include one or more microprocessors, processors, a system on a chip (integrated circuit), or one or more microcontrollers. The processing system includes processing logic 126 for executing software instructions of one or more programs. The system 100 includes memory 105 for storing data and programs for execution (software 106) by the processing system. The memory 105 can store, for example, software components such as a planter monitor software application for monitoring and controlling field operations or any other software application. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

Display devices 125 and 130 can provide visual user interfaces for a user or operator. The display devices may include display controllers. In one embodiment, the display device 125 is a tablet device or computing device with a touchscreen that displays images (e.g., high definition field maps of as-planted or as-harvested data) and data generated by the planter monitor software application and receives input from the user or operator for monitoring and controlling field operations. The operations may include configuration of the machine or implement, reporting of data, control of the machine or implement including sensors and controllers, and storage of the data generated. The display device 130 may be a display (e.g., display provided by an original equipment manufacturer (OEM)) that displays images and data for controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 170 may include an additional control module for enabling or disabling certain components or devices of the machine or implement. For example, if the user or operator is not able to control the machine or implement using one or more of the display devices, then the cab control module may include switches to shut down or turn off components or devices of the machine or implement. In one embodiment, the cab control module 170 allows the user or operator to disable or enable a planter or at least one section of the planter. The cab control module may include indicators (e.g., colored LED indicators) to indicate whether a section or multiple sections of a planter have been disabled (shut down) or enabled.

It will be appreciated that additional components, not shown, may also be part of the system in certain embodiments, and in certain embodiments fewer components than shown in FIG. 1 may also be used in a data processing system. It will be appreciated that one or more buses, not shown, may be used to interconnect the various components as is well known in the art.

The memory 105 may be a machine-accessible non-transitory medium on which is stored one or more sets of instructions (e.g., software 106) embodying any one or more of the methodologies or functions described herein. The software 106 may also reside, completely or at least partially, within the memory 105 and/or within the processing system 120 during execution thereof by the system 100, the memory and the processing system also constituting machine-accessible storage media. The software 106 may further be transmitted or received over a network via the network interface device 118.

In one embodiment, a machine-accessible non-transitory medium (e.g., memory 105) contains executable computer program instructions which when executed by a data processing system cause the system to perform field operations. For example, the field operations include monitoring and controlling the machine and/or implement.

While the machine-accessible non-transitory medium (e.g., memory 105) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of embodiments of the present invention. The term "machine-accessible non-transitory medium" shall accordingly be taken to include, but not be limited to, solid-state memories, optical and magnetic media, and carrier wave signals.

Figure 2:
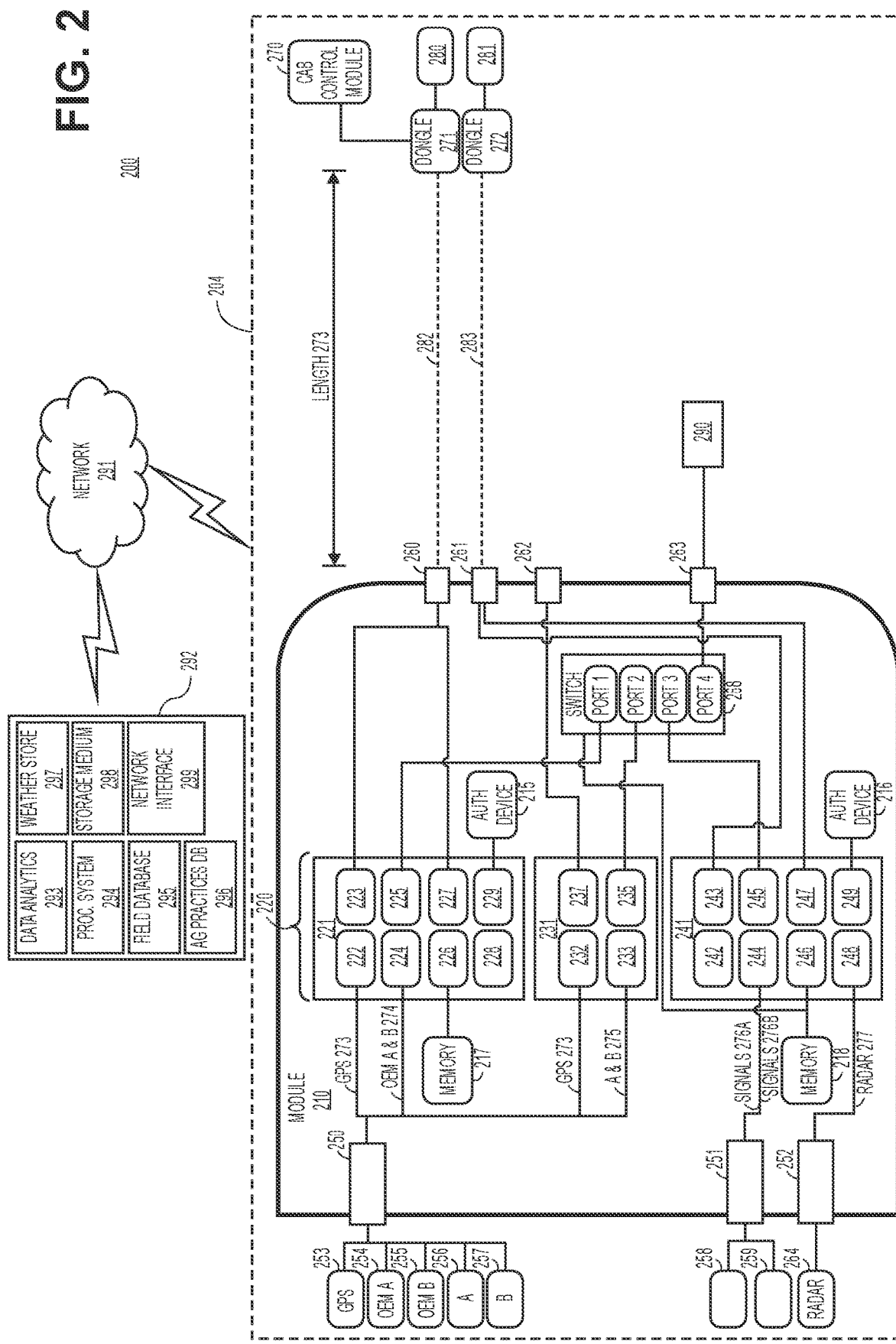
FIG. 2 shows an example of a system for monitoring, controlling, and displaying field operations in accordance with one embodiment.

FIG. 2 shows an example of a system for monitoring, controlling, and displaying field operations in accordance with one embodiment. For example and in one embodiment, the system 200 may be implemented as a cloud based system with servers, data processing devices, computers, etc. Aspects, features, and functionality of the system 200 can be implemented in servers, planters, planter monitors, combines, laptops, tablets, computer terminals, client devices, user devices, handheld computers, personal digital assistants, cellular telephones, cameras, smart phones, mobile phones, computing devices, or a combination of any of these or other data processing devices.

The system 200 (e.g., cloud based system) for monitoring, controlling, and displaying field operations may include an agricultural analysis system 292 that includes a weather store 297 with current and historical weather data and at least one processing system 294 for executing instructions for performing agricultural data analysis. The storage medium 298 may store instructions, software, software programs, etc. for execution by the processing system and for performing operations of the agricultural analysis system 292. A data analytics module 293, a field information database 295, and an agricultural practices information database 296 include similar features and functionality as the data analytics module 130, a field information database 134, and an agricultural practices information database 135, respectively, of FIG. 1.

The system 292 shown in FIG. 2 may include a network interface 299 for communicating with other systems or devices such as data processing system 204 (e.g., machines, planters, combines, etc.), weather devices, and user devices via a network 291 (e.g., Internet, wide area network, WiMax, satellite, cellular, IP network, etc.). The network interface include one or more types of transceivers for communicating via the network 291.

The processing system 294 may include one or more microprocessors, processors, a system on a chip (integrated circuit), or one or more microcontrollers. The processing system includes processing logic for executing software instructions of one or more programs.

The system 200 includes a data processing system 204 (e.g., data processing system of a machine, data processing system of a planter, data processing system of a combine, etc.) in accordance with one embodiment. Embodiments of the data processing system 204 include similar components and functionality in comparison to the data processing system 104. The data processing system 204 shown in FIG. 2 includes a data transfer and processing module 210 that includes a processing system 220, memory 217 and 218 (e.g., flash memory), and switch 268 The data transfer and processing module 210 may include similar components and functionality in comparison to the data transfer and processing module 122 of FIG. 1. The processing system 220 include microcontrollers 221 and 241 and processor 231 (e.g., system on a chip). The microcontrollers and processor include processing logic for executing software instructions of one or more programs. The microcontrollers 221 and 241 may include different modules including modules 222-229 and modules 242-249, respectively. The processor may include modules 232, 233, 235, and 237. These modules communicate bi-directionally with other devices, controllers, and sensors. For example, a GPS unit 253 communicates bi-directionally with modules 222 (e.g., RS 232 module) and 232 (e.g., RS 232 module) via a connector 250 (e.g., AMP 16-pin connector). The GPS unit 253 may send GPS signals 273 to the modules 222 and 232.

In one embodiment, OEM device A 254 and OEM device B 255 include sensors and controllers for sending OEM A and B signals to module 224 via the connector 250 using a controller area network (CAN) serial bus protocol. In another embodiment, a different type of bus protocol can be used (e.g., ISOBUS). The OEM sensors may be moisture sensors or yield sensors for a combine, speed sensors for the machine, seed sensors or downforce sensors for a planter, liquid application sensors for a sprayer, or vacuum, lift, lower sensors for a planter or other implement. Devices A 256 and B 257 may communicate with module 233 (e.g., RS 485 module) and send signals A and B 275 to the module 233. In one embodiment, the devices A 256 and B 257 include a plurality of seed sensors that detect passage of seed. In another embodiment, the devices A 256 and B 257 include processors in communication with a plurality of seed sensors. The processors are configured to process seed sensor data and transmit processed data to the data transfer and processing module.

The devices 258 and 259 may communicate with module 244 via connector 251 (e.g., AMP 9-pin) using a CAN serial bus protocol or ISOBUS. The device 258 may include controllers and sensors for monitoring motors and drives on a planter including a variable rate drive system for changing plant populations. The device 258 may also provide swath control to shut off individual rows or sections of the planter. The device 258 sends these signals 276a (e.g., swath control signals associated with a swath control system such as RowFlow® available from Precision Planting) to module 244. The device 259 may include controllers and sensors for generating and sending signals 276b (e.g., seed sensor signals, planter downforce signals, seed meter drive control signals associated with a seed meter such as the vDrive® seed meter available from Precision Planting, seed conveyor control signals associated with a seed conveyor such as the SpeedTube seed delivery system available from Precision Planting) to module 244. These signals may sense changes in an electric motor that controls each row of a planter individually. These signals may sense seed delivery speeds in a seed tube for each row of a planter.

The modules 226 and 246 (e.g., serial peripheral interface (SPI) modules) communicate bi-directionally with memory (e.g., flash memory 217 and 218) that is external from the microcontrollers 221 and 241). The module 248 (e.g., input capture module 248) communicates bi-directionally with radar unit 264 that may be located on a machine. Radar signals 277 are sent from the radar unit 264 to the module 248.

A switch 268 (e.g., Ethernet switch 268) communicates with modules 225, 235, and 245 (e.g., Ethernet modules 225, 235, 245). The switch 268 includes ports 1-4 and these ports can be coupled for communication with other devices including an OEM display device 290 for displaying data received by the switch 268. The data displayed on the OEM display device 290 may be used for controlling a machine (e.g., planter, tractor, combine, sprayer, etc.), steering the machine, and monitoring the machine or an implement (e.g., planter, combine, sprayer, etc.) that is connected to the machine with sensors located on the machine or implement. The OEM display device may comprise a dedicated (e.g., single-purpose) computing device configured to monitor and control the implement; the OEM display device may be comprise a component or optional feature of the implement.

The data transfer and processing module 210 may include ports 260-263 for communicating bi-directionally with external devices and systems. The ports 260 and 261 may be stacked ports that each include a USB port and a 4 pin port for RS485 communications. The USB ports may communicate with modules 227 and 247 (e.g., USB modules) while the 4-pin ports communicate with modules 223 and 243 (e.g., RS485 modules). The USB port 262 may communicate with module 237 (e.g., USB module 237) in order to provide direct access to the USB module 237 using a flash drive.

The ports 260 and 261 are coupled to the dongles 271 and 272, respectively. The dongles 271 and 272 (e.g., data transfer devices such as electrical connectors) are coupled to display devices 280 and 281 (e.g., tablet devices 280 and 281), respectively. The display device 281 may optionally be included or not included in the data processing system 200.

Display devices 280 and 281 can provide visual user interfaces for a user or operator. The display devices may include display controllers. In one embodiment, the display device 280 is a tablet device with a touchscreen that displays images and data generated by the planter monitor software application (or any other software application) and receives input from the user or operator for monitoring and controlling field operations. The operations may include configuration of the machine or implement, reporting of data, control of the machine or implement, and storage of the data generated. The display devices 280 and 281 may comprise multi-function consumer tablet devices, e.g., tablet devices configured to operate an Internet browser and/or other software unrelated to monitoring or control of the implement.

In one embodiment, at least one of the display devices 280 and 281 can be synchronized with the OEM display device 290. A user or operator can view the same application on at least one of the display devices 280 and 281 in addition to the display device 290. A first set of data associated with an application can be viewed on at least one of the display devices 280 and 281 while a second set of data associated with the application can be viewed on the display device 290. In another embodiment, a first application can be viewed on at least one of the display devices 280 and 281 while a second application can be viewed on the display device 290.

A cab control module 270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement including a planter or sections of the planter. The cab control module may include indicators (e.g., colored LED indicators) to indicate whether a section or multiple sections of a planter have been disabled (i.e., shut down or turned off) or enabled.

The authentication devices 215 and 216 provide authentication between the data transfer and processing module 122 and the display devices 280 and 281. For example, the authentication device 215 may authenticate a user and the display device 280 prior to allowing the user to monitor and control field operations using the data transfer and processing module 210. The authentication device 216 may authenticate a user and the display device 281 prior to allowing the user to monitor and control field operations using the data transfer and processing module 210.

The length 273 of communication links 282 and 283 may be limited to a certain distance for reliable bi-directional communications between the dongles and the data transfer and processing module 210. In one embodiment, the length 273 is 5 feet or shorter. In another embodiment, the length 273 is 10 feet or shorter.

The system 200 includes memory (e.g., memory 217 and 218) or internal memory of the processor or microcontrollers for storing data and programs for execution by the processing system. The memory can store, for example, software components such as a planter monitor software application for monitoring and controlling field operations. The memory can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

Figure 3:
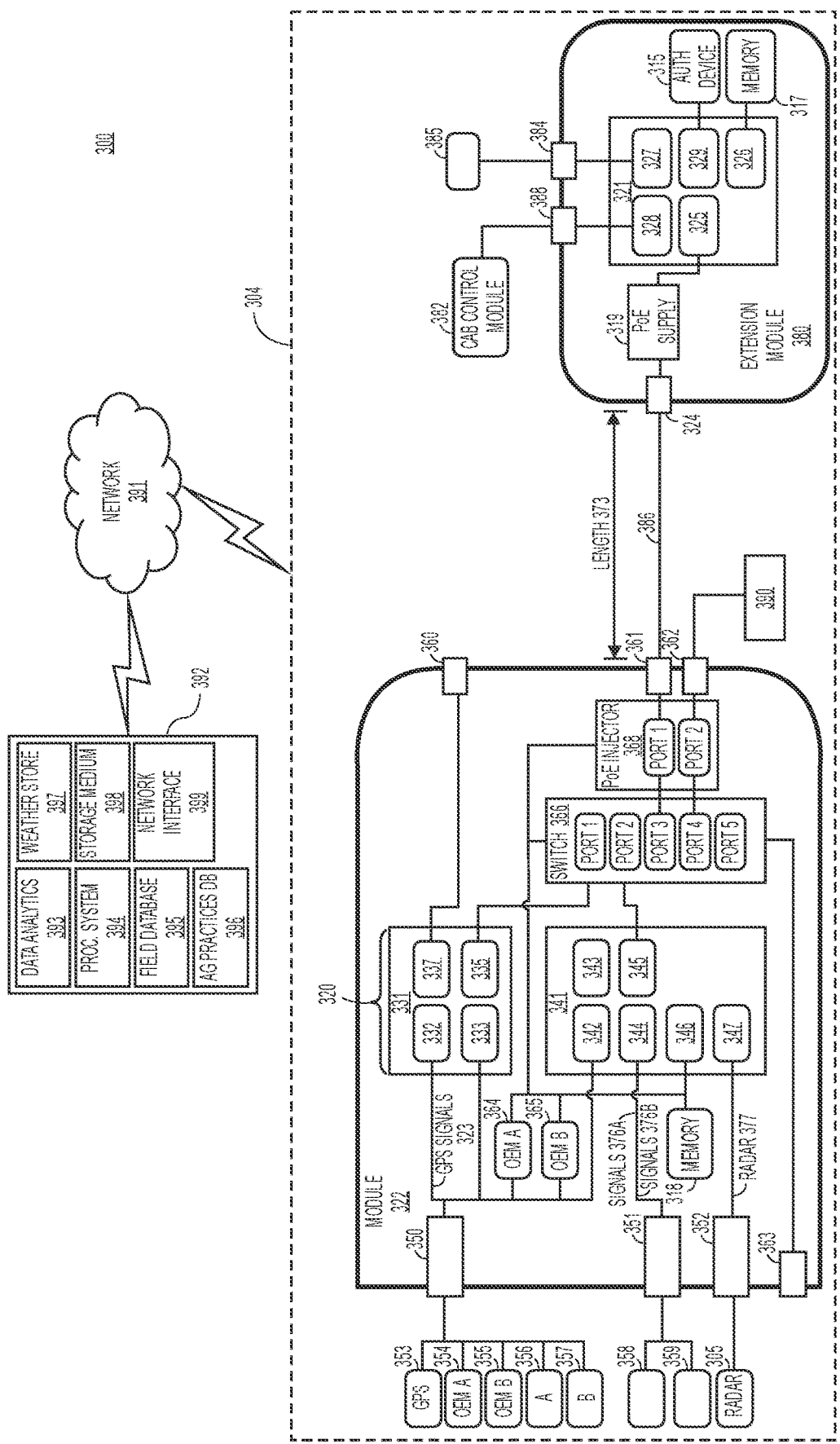
FIG. 3 shows an example of a system for monitoring, controlling, and displaying field operations in accordance with one embodiment.

FIG. 3 shows an example of a system for monitoring, controlling, and displaying field operations in accordance with one embodiment. For example and in one embodiment, the system 300 may be implemented as a cloud based system with servers, data processing devices, computers, etc. Aspects, features, and functionality of the system 300 can be implemented in servers, planters, planter monitors, combines, laptops, tablets, computer terminals, client devices, user devices, handheld computers, personal digital assistants, cellular telephones, cameras, smart phones, mobile phones, computing devices, or a combination of any of these or other data processing devices.

The system 300 (e.g., cloud based system) for monitoring, controlling, and displaying field operations may include an agricultural analysis system 392 that includes a weather store 397 with current and historical weather data and at least one processing system 394 for executing instructions for performing agricultural data analysis. The storage medium 398 may store instructions, software, software programs, etc. for execution by the processing system and for performing operations of the agricultural analysis system 392. A data analytics module 393, a field information database 395, and an agricultural practices information database 396 include similar features and functionality as the data analytics module 130, a field information database 134, and an agricultural practices information database 135, respectively, of FIG. 1.

The system 392 shown in FIG. 3 may include a network interface 399 for communicating with other systems or devices such as data processing system 304 (e.g., machines, planters, combines, etc.), weather devices, and user devices via a network 391 (e.g., Internet, wide area network, WiMax, satellite, cellular, IP network, etc.). The network interface includes one or more types of transceivers for communicating via the network 391.

The processing system 394 may include one or more microprocessors, processors, a system on a chip (integrated circuit), or one or more microcontrollers. The processing system includes processing logic for executing software instructions of one or more programs.

The system 300 includes a data processing system (e.g., data processing system of a machine, data processing system of a planter, data processing system of a combine, etc.) in accordance with one embodiment. Embodiments of the data processing system 300 include similar components and functionality in comparison to the data processing system 100. The data processing system 300 shown in FIG. 3 includes a data transfer and processing module 322 that includes a processing system 320, memory 318 (e.g., flash memory 318), a switch 350, and a power over Ethernet (PoE) injector 368. The data transfer and processing module 322 may include similar components and functionality in comparison to the data transfer and processing module 122 of FIG. 1. PoE provides both data and power connections in one cable such that devices and components do not need require two cables for data and power. The processing system 320 include microcontroller 341 and processor 331 (e.g., system on a chip). The microcontroller and processor include processing logic for executing software instructions of one or more programs. The microcontroller 341 may include different modules including modules 342-347. The processor 331 may include modules 332, 333, 335, and 337. These modules communicate bi-directionally with other devices and sensors. For example, a GPS unit 353 communicates bi-directionally with module 332 (e.g., RS 232 module) via a connector 350 (e.g., AMP 16-pin connector). The GPS unit 353 may send GPS signals 373 to the module 332.

OEM devices A 354 and OEM B 355 send OEM A and B signals to one or more modules (e.g., OEM A 364, OEM B 365, SPI module 346) via the connector 350 using the controller area network (CAN) serial bus protocol or ISOBUS. The OEM devices may include sensors and controllers. The sensors may be moisture sensors or flow sensors for a combine, speed sensors for the machine, seed force sensors for a planter, liquid application sensors for a sprayer, or vacuum, lift, lower sensors for an implement. Devices A 356 and B 357 may communicate with module 333 (e.g., RS 485 module) and send signals to the module 333. In one embodiment, the devices A 356 and B 357 include a plurality of seed sensors that detect passage of seed. In another embodiment, the devices A 356 and B 357 include processors in communication with a plurality of seed sensors. The processors are configured to process seed sensor data and transmit processed data to the data transfer and processing module.

The devices 358, 359, 364, and 365 may communicate with module 344 and memory 318 via connector 351 (e.g., AMP 9-pin) using the CAN serial bus protocol or ISOBUS. The devices 358 may monitor motors and drives on a planter including a variable rate drive system for changing plant populations. The device 358 may also provide swath control to shut off individual rows or sections of the planter. The device 358 sends these signals 376*a* (e.g., swath control signals associated with a swath control system such as RowFlow® available from Precision Planting) to module 344. The device 359 may generate and send signals 376*b* (e.g., seed sensor signals, planter downforce signals, seed meter drive control signals associated with a seed meter such as the vDrive® seed meter available from Precision Planting, seed conveyor control signals associated with a seed conveyor such as the SpeedTube seed delivery system available from Precision Planting) to module 344. These devices may include controllers and sensors for sensing changes in an electric motor that controls each row of a planter individually. These signals may sense seed delivery speeds in a seed tube for each row of a planter.

In one embodiment, the devices OEM A 364 and OEM B 365 are located within the data transfer and processing module 322. If the data transfer and processing module 322 is located on or near an implement, then these devices can monitor parameters associated with the implement. If the data transfer and processing module 322 is located on or near a machine (e.g., tractor cab), then these devices can monitor parameters associated with the machine.

The module 346 (e.g., serial peripheral interface (SPI) module) communicates bi-directionally with memory (e.g., flash memory 318) that is external from the microcontroller 341). This module 346 may include internal memory for the microcontroller 341. The module 347 (e.g., input capture module 347) communicates bi-directionally with radar unit 305 that may be located on a machine or implement. Radar signals 377 are sent from the radar unit 305 to the module 347.

A switch 368 (e.g., Ethernet switch 368) communicates bi-directionally with different devices and components including modules 335, 345 (e.g., Ethernet modules 335, 345), OEM A 364, OEM B 365, and port 363. The switch 368 includes ports 1-5 and these ports can be coupled for communication with other devices including the PoE injector 368. Port 3 of the switch is shown as being coupled to port 1 of the injector while port 4 of the switch is coupled to port 2 of the injector. However, any ports of the switch can be coupled to any of the ports of the injector. Port 1 of the injector is coupled to a port 361 (e.g., RJ45 port) while port 2 of the injector is coupled to port 362 (e.g., RJ45 port) of the data transfer and processing module 322. An OEM display device 390 for displaying data can be communicatively coupled to the port 362. The data displayed on the OEM display device 390 may be used for controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

The data transfer and processing module 322 may include ports 360-362 for communicating bi-directionally with external devices and systems. The USB port 362 may communicate with module 337 (e.g., USB module 337) in order to provide direct access to the USB module 337 using a flash drive. The port 361 is coupled to a port 324 (e.g., RJ45 port) of an extension module 380, which includes a PoE supply 319, a microcontroller 321, a memory 317 (e.g., flash memory), and an authentication device 315. The microcontroller 321 includes module 328 (e.g., RS485 module 328), module 325 (e.g., Ethernet module 325) for receiving communications from PoE supply 319, a module 326 (e.g., SPI module 326, a module 327 (e.g., a USB module 327), and a module 329 (e.g., a USB module 329). The module 326 communicates bi-directionally with memory 317 while the module 329 communicates bi-directionally with authentication device 315. The module 327 communicates bi-directionally with port 384 (e.g., USB port 384), which communicates bi-directionally with display device 385. The module 328 communicates bi-directionally with port 388 (e.g., USB port 388), which communicates bi-directionally with cab control module 382. An additional display device (not shown) may optionally be included or not included in the data processing system 300.

Display device 385 can provide visual user interfaces for a user or operator. The display device may include a display controller. In one embodiment, the display device 385 is a tablet device with a touchscreen that displays images and data generated by the planter monitor software application (or any other software application) and receives input from the user or operator for monitoring and controlling field operations. The operations may include configuration of the machine or implement, reporting of data, control of the machine or implement, and storage of the data generated.

In one embodiment, the display device 385 can be synchronized with the OEM display device 390. A user or operator can view the same application on the display device 385 in addition to the display device 390. A first set of data associated with an application can be viewed on the display device 385 while a second set of data associated with the application can be viewed on the display device 390. In another embodiment, a first application can be viewed on the display device 385 while a second application can be viewed on the display device 390.

A cab control module 382 may include an additional control module for enabling or disabling certain components or devices of the machine or implement. For example, if the user or operator is not able to control the machine or implement using one or the display devices, then the cab control module may include switches to shut down or turn off components or devices of the machine or implement including a planter or sections of the planter. The cab control module may include indicators (e.g., colored LED indicators) to indicate whether a section or multiple sections of a planter have been disabled or enabled.

The authentication device 315 provides authentication between the extension module 380 and the display device 392. For example, the authentication device 315 may authenticate a user and the display device 385 prior to allowing the user to monitor and control field operations using the extension module 380.

The length 373 of communication link 386 may be a long distance for reliable bi-directional communications between the extension module 380 and the data transfer and processing module 322. In one embodiment, the length 373 is 100 meters or shorter. Thus, the data transfer and processing module can be mounted in a machine (e.g., floor of a cab of the machine) or it can be mounted on the implement due to the long distance for the communication link 386, which also provides power from the PoE supply 319.

The system 300 includes memory (e.g., flash 317 and 318) or internal memory of the microcontrollers or processor for storing data and programs for execution by the processing system. The memory can store, for example, software components such as a planter monitor software application for monitoring and controlling field operations. The memory can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

It will be appreciated that additional components, not shown, may also be part of the system in certain embodiments, and in certain embodiments fewer components than shown in FIG. 3 may also be used in a data processing system. It will be appreciated that one or more buses, not shown, may be used to interconnect the various components as is well known in the art.

In one embodiment, a machine-accessible non-transitory medium (e.g., memory 317, 318, internal memory of the microcontrollers or processor) contains executable computer program instructions which when executed by a data processing system cause the system to perform field operations. For example, the field operations include monitoring and controlling the machine and/or implement.

Figure 4:
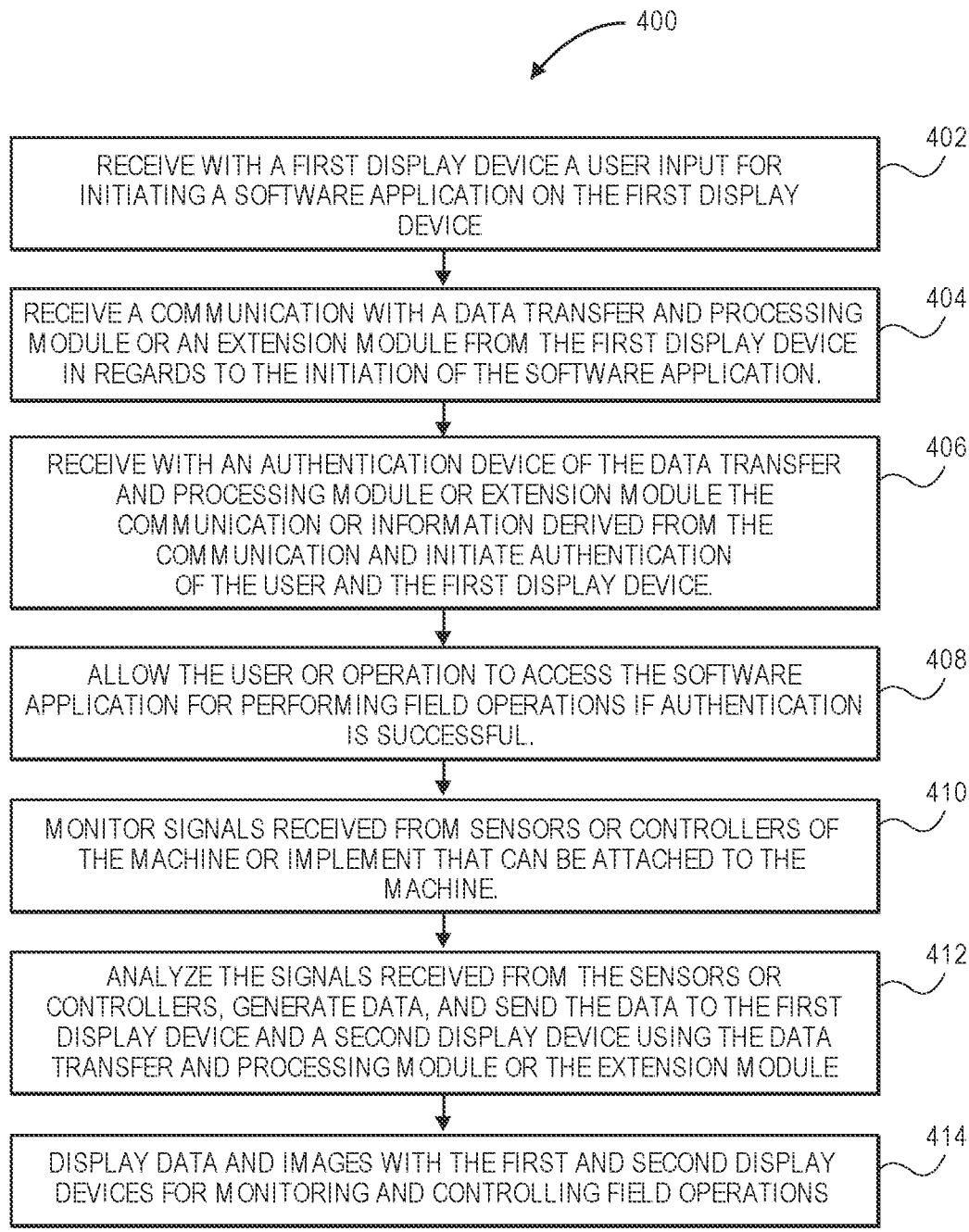
FIG. 4 illustrates a flow diagram of one embodiment for a method 400 of operating a data transfer and processing module (or data transfer and processing module in combination with an extension module) for field operations including planting or harvesting operations.

FIG. 4 illustrates a flow diagram of one embodiment for a method 400 of operating a data transfer and processing module (or data transfer and processing module in combination with an extension module) for field operations including planting or harvesting operations. The method 400 is performed by processing logic that may comprise hardware (circuitry, dedicated logic, etc.), software (such as is run on a general purpose computer system or a dedicated machine or a device), or a combination of both. In one embodiment, the method 400 is performed by processing logic of at least one data processing system (e.g., processing system of a planter, processing system of a combine, processing system of a machine). The data processing system includes a data transfer and processing module (e.g., data transfer and processing module 122, 222, 322), an extension module 380, or other electronic device that executes instructions of a software application or program with processing logic. The software application or program can be initiated by an operator or user of a machine (e.g., tractor, planter, combine).

At block 402, a first display device receives a user input for initiating a software application (e.g., planter monitor application) on the first display device. At block 404, the data transfer and processing module or extension module receives a communication from the first display device in regards to the initiation of the software application. At block 406, an authentication device of the data transfer and processing module or extension module receives the communication or information derived from the communication and initiates authentication of the user and the first display device. At block 408, if authentication is successful, then the user or operator is allowed to access the software application for performing field operations. At block 410, the data transfer and processing module or extension module may monitor signals received from different controllers and sensors of the machine or an implement that can be attached to the machine. At block 412, the data transfer and processing module or extension module can analyze the signals received from the sensors or controllers, generate data, and send the data to the first display device and a second display device (or at least one display device). At block 414, the first and second display devices (or at least one display device) can display data and images for monitoring and controlling field operations. For example, the data and images may include different types of maps.

In one embodiment, the first and second display devices can be synchronized. A user or operator can view the same application on the first and second display devices. A first set of data associated with an application can be viewed on a first display device while a second set of data associated with the application can be viewed on the second display device. In another embodiment, a first application can be viewed on a first display device while a second application can be viewed on the second display device.

In one embodiment, for a planter, a map indicates seed coverage showing which region(s) in a field have been planted by the planter. The seed coverage map can be displayed on the display device in a tractor cab in order for the operator to see which type of seed variety has been planted in a particular region of the field. In another embodiment, for a planter, a map indicates seed population (e.g., number of seeds per acre that have been planted). In another embodiment, for a planter, a map indicates seed spacing such that an operator can determine how evenly the seeds are spaced. In an embodiment, a map for a planter indicates downforce in planting seeds. An operator can determine how much additional downforce was applied or how much net downforce was applied to the ground when planting the seeds.

In one embodiment, for a combine, a map shows harvested coverage of the combine such that an operator knows which region(s) have been harvested. In an embodiment, for a combine, a map show yield (e.g., corn or soybean yield in terms of bushels per acre).

In some embodiments, the operations of the method(s) disclosed herein can be altered, modified, combined, or deleted. The methods in embodiments of the present invention may be performed with a device, an apparatus, or data processing system as described herein. The device, apparatus, or data processing system may be a conventional, general-purpose computer system or special purpose computers, which are designed or programmed to perform only one function, may also be used.

Figure 5:
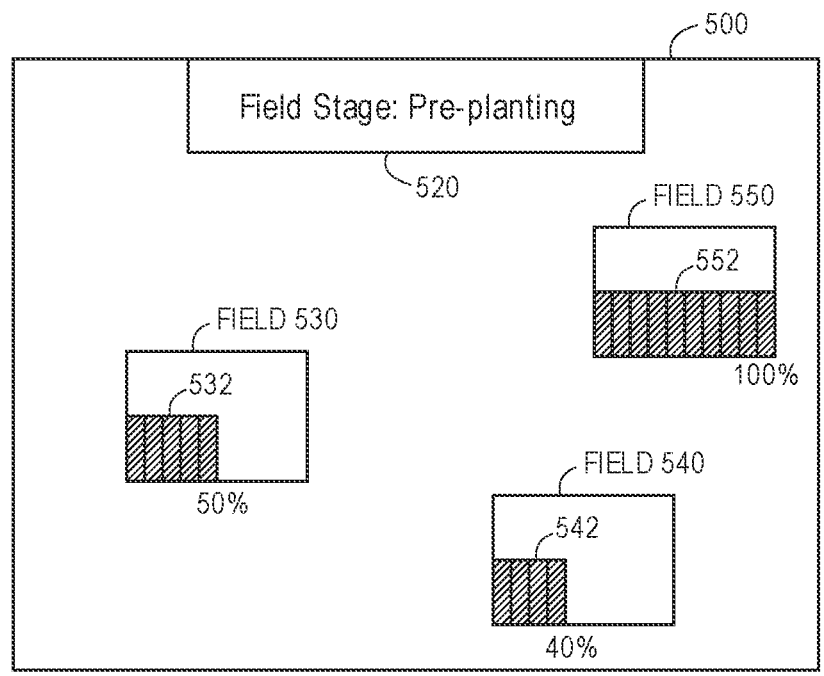
FIG. 5 illustrates an exemplary field stage map 500 prior to planting in accordance with one embodiment.

FIG. 5 illustrates an exemplary field stage map 500 prior to planting in accordance with one embodiment. The field stage map 500 is displayed on a monitor (e.g., display device 125, display device 130, display devices 280 and 281, OEM display device 290, display device 392, OEM display device 390, computing device, etc.) in a tractor cab of a machine or the field stage map 500 is displayed on a device (e.g., tablet device, computing device, desktop computer, cellular phone) that can be located at any location in order for the operator to make a planting decision for one or more fields. The identification region 520 identifies a type of map (e.g., field stage) and type of stage (e.g., pre-planting, post-planting A, post-planting B, growth, harvest, etc.). The field stage map 500 illustrates a pre-planting stage for fields 530, 540, and 550. Each field includes a scale region for displaying a planting decision-making parameter or value (e.g., percentage value of progress from typical winter soil temperature to a spring planting temperature) and/or a number of bars that indicates the planting decision-making parameter or value on a scale (e.g., 1 to 10) for determining whether an operator should be planting a crop or not. A lower value (e.g., 0-50%, 1 to 5) may indicate that the soil and/or weather conditions are not appropriate for planting a crop while a higher value (e.g., 50-100%, 6-10) may indicate that the soil and/or weather conditions are appropriate or will soon be appropriate for planting a crop. A lower value or bars of the scale region may be shaded with a first color (e.g., red) while a higher value or bars of the scale region may be shaded with a second color (e.g., green). The value (e.g., soil temperature) is based on a pre-planting function that analyzes pre-planting parameters (e.g., soil moisture, air temperature, weather forecast, soil temperature, etc.) to determine whether an operator should plant seed in a field. These pre-planting parameters may be obtained from any source including a cloud-based source, directly from a probe in a field of interest, from an implement in the field, a remote server, a weather station, etc. For example, a probe or sensor on a machine or implement may obtain soil moisture or soil temperature data.

The field 530 includes a scale region 532 having a number of bars optionally shaded as a first color that indicates a value of 50%. The field 540 includes a scale region 542 having a number of bars optionally shaded as a first color that indicates a value of 40%. Fields 530 and 540 have lower values indicating that these fields are not ready for planting. Field 550 includes a scale region 552 having a number of bars optionally shaded as a second color (e.g., green) that indicates a value of 100%. The higher value of Field 550 indicates to the operator that this field is ready for planting. In one embodiment, the field stage map is updated dynamically in real-time as the additional data is provided for the pre-planting function.

An operator can select any of the fields 530, 540, and 550 in order to display more details of the pre-planting stage for the field. For example, the soil moisture data, air temperature data, weather forecast data, and soil temperature data may be displayed for the selected field.

Figure 6:
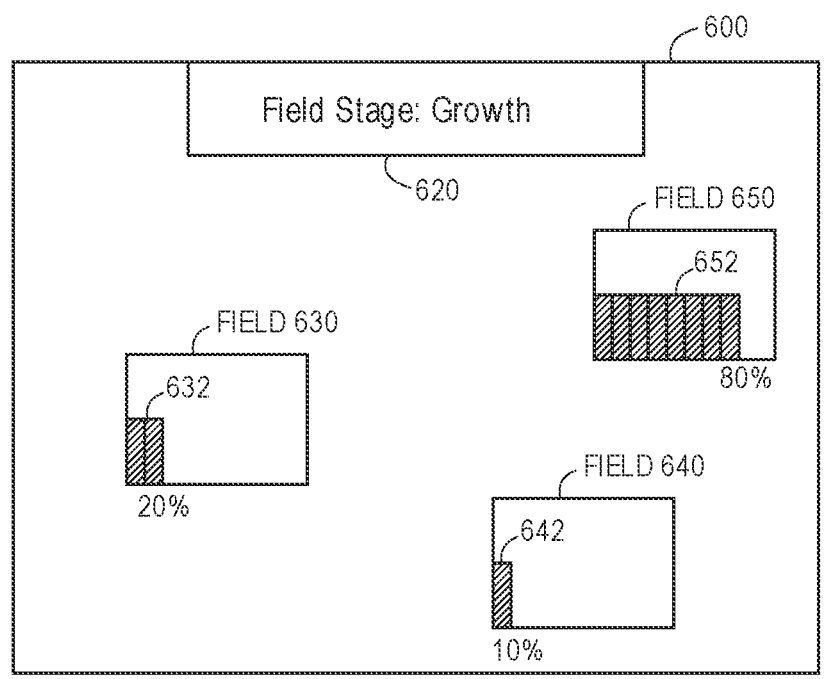
FIG. 6 illustrates an exemplary field stage map 600 showing one or more growth stages after planting in accordance with one embodiment.

FIG. 6 illustrates an exemplary field stage map 600 showing one or more growth stages after planting in accordance with one embodiment. The field stage map 600 is displayed on a monitor (e.g., display device 125, display device 130, display devices 280 and 281, OEM display device 290, display device 392, OEM display device 390, computing device, etc.) in a tractor cab of a machine or the field stage map 600 is displayed on a device (e.g., tablet device, computing device, desktop computer, cellular phone) that can be located at any location in order for the operator to make a decision or take an action (e.g., irrigation scheduling, fertilizer application) for one or more fields. The identification region 620 identifies a type of map (e.g., field stage) and type of stage (e.g., pre-planting, post-planting A, post-planting B, growth, harvest, etc.). The field stage map 600 illustrates a growth stage (e.g., relative maturity) after planting for fields 630, 640, and 650. Each field includes a scale region for displaying a parameter or value (e.g., percentage value of growth stages passed relative to a total number of growth stages of the crop) and/or a number of bars that indicates the parameter or value on a scale (e.g., percentage value from 0-100%, 1 to 10) for assisting with a decision (e.g., irrigation scheduling, fertilizer application) for the growth stage of the field. A lower value (e.g., 0-50%, 1-5) may indicate that the growth stage is not appropriate for a decision (e.g., irrigation scheduling, fertilizer application) while a higher value (e.g., 50-100%, 6-10) may indicate that the growth stage of the crop is appropriate or will soon be appropriate for the decision (e.g., irrigation scheduling, fertilizer application). A lower value or lower number of bars of the scale region may be shaded with a first color (e.g., red) while a higher value or higher number of bars of the scale region may be shaded with a second color (e.g., green). In another embodiment, a higher value (e.g., 50-100%, 5-10) may indicate that the growth stage is not appropriate for a decision (e.g., irrigation scheduling, fertilizer application) while a lower value (e.g., 0-50%, 1-5) may indicate that the growth stage of the crop is appropriate or will soon be appropriate for the decision (e.g., irrigation scheduling, fertilizer application).

The value is based on a growth stage function that analyzes growth parameters (e.g., time period since crop was planted, temperature parameter during the time period since the crop was planted, soil moisture, air temperature, weather forecast, soil temperature, etc.) to determine whether an operator should make a decision or take an action (e.g., irrigation scheduling, fertilizer application) if the crop has reached an appropriate growth stage. These growth parameters may be obtained from any source including a cloud based source, directly from a probe in a field of interest, from an implement in the field, a remote server, a weather station, etc. The field 630 includes a scale region 632 having a number of bars optionally shaded as a first color that indicates a value of 20%. The field 640 includes a scale region 642 having a number of bars optionally shaded as a first color that indicates a value of 10%. Fields 630 and 640 have lower values indicating that these fields are not ready for making a decision or taking an action (e.g., irrigation scheduling, fertilizer application). Field 650 includes a scale region 552 having a number of bars optionally shaded as a second color (e.g., green) that indicates a value of 80%. The higher value of Field 650 indicates to the operator that this field is ready for making a decision (e.g., irrigation scheduling, fertilizer application). In one embodiment, the field stage map is updated dynamically in real-time as the additional data is provided for the growth stage function.

An operator can select any of the fields 630, 640, and 650 in order to display more details of the growth stage for the field. For example, any type of growth stage data may be displayed for the selected field. The growth stage data and field stage map 600 is relevant until a crop (e.g., corn, soybeans) reaches maturity. Upon reaching maturity, a harvest stage map is then relevant for the crop. For corn, a black layer indicates that the corn has reached physiological maturity. Upon reaching black layer, a harvest stage map is then relevant for operation of the corn fields.

Figure 7:
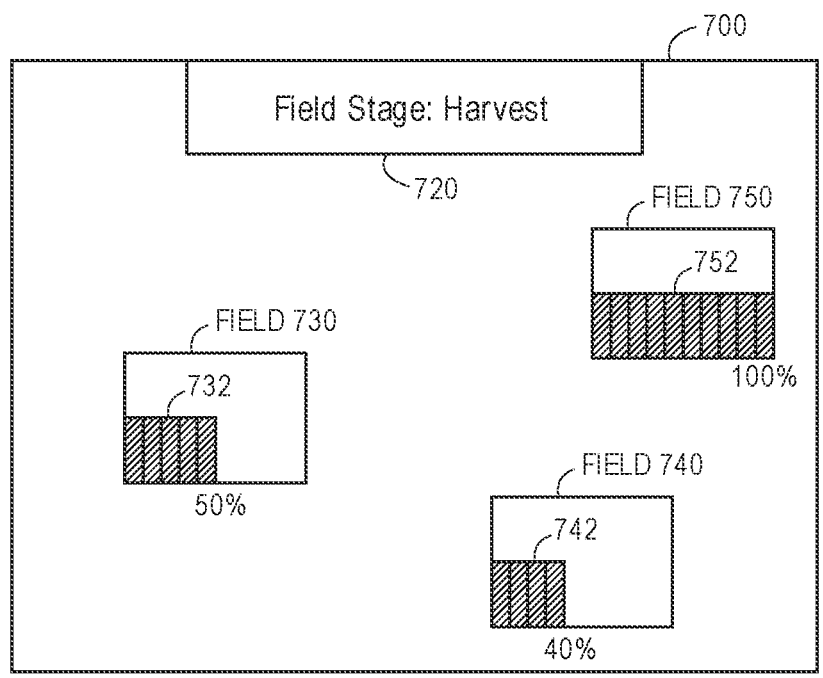
FIG. 7 illustrates an exemplary field stage map 700 for harvesting in accordance with one embodiment.

FIG. 7 illustrates an exemplary field stage map 700 for harvesting in accordance with one embodiment. The field stage map 700 is displayed on a monitor (e.g., display device 125, display device 130, display devices 280 and 281, OEM display device 290, display device 392, OEM display device 390, computing device, etc.) in a tractor cab of a machine or the field stage map 700 is displayed on a device (e.g., tablet device, computing device, desktop computer, cellular phone) that can be located at any location in order for the operator to make a decision or take an action (e.g., harvesting the crop) for one or more fields. The identification region 720 identifies a type of map (e.g., field stage) and type of stage (e.g., pre-planting, post-planting A, post-planting B, growth, harvest, etc.). The field stage map 700 illustrates a harvest stage after the crop seed reaches maturity (e.g., black layer for corn) for a crop for fields 730, 740, and 750. Each field includes a scale region for displaying a parameter or value (e.g., grain moisture expressed as a percentage difference between a typical black layer value and a desired harvesting value for corn, grain moisture expressed as a percentage difference between a typical mature value to a desired harvesting value for soybeans, etc.) and/or a number of bars that indicates the value on a scale (e.g., 0-100%, 1 to 10) for assisting with a decision (e.g., when to harvest) for the harvest stage of the field. A lower value (e.g., 1-5) may indicate that the grain moisture level is not ready for harvesting while a higher value (e.g., 6-10) may indicate that the grain moisture level is ready for harvesting. A lower value or lower number of bars of the scale region may be shaded with a first color (e.g., red) while a higher value or higher number of bars of the scale region may be shaded with a second color (e.g., green). The value is based on a harvest stage function that analyzes harvest parameters (e.g., estimated grain moisture, soil moisture, air temperature, weather forecast, soil temperature, etc.) to determine whether an operator should be harvesting the crop. These harvest parameters may be obtained from any source including a cloud based source, directly from a probe in a field of interest, from an implement in the field, a remote server, a weather station, etc. The field 730 includes a scale region 732 having a number of bars optionally shaded as a first color that indicates a value of 50%. The field 740 includes a scale region 742 having a number of bars optionally shaded as a first color that indicates a value of 40%. Fields 730 and 740 have lower values indicating that these fields are likely not ready for harvesting. Field 750 includes a scale region 752 having a number of bars optionally shaded as a second color (e.g., green) that indicates a value of 100%.

The higher value of field 750 indicates to the operator that this field is ready for harvesting the crop. In one embodiment, the field stage map is updated dynamically in real-time as the additional data is provided for the harvest stage function.

An operator can select any of the fields 730, 740, and 750 in order to display more details of the harvest stage for the field. For example, any type of harvest stage data may be displayed for the selected field.

In the maps 500, 600, 700, the fields (e.g., fields 530, 540, 550 in map 500) are preferably displayed in their geospatial relation to one another. In some embodiments, fields comprise field boundaries superimposed over an aerial map (e.g., a collection of aerial map image tiles) of an area including each of the fields.

In some embodiments, the values indicated by the scale region of each map 500, 600, 700 are generated for each map such that at each field stage (e.g., pre-planting, growth, harvest) the value represents the percentage completion of the respective field stage. In such embodiments, the value preferably has a common scale in each of the field stages (e.g., pre-planting, growth, harvest) such that, for example, a 50% value in any field stage represents 50% completion of that field stage.

In some embodiments, the display device 125 (e.g., a web application, mobile application, or desktop software application) simultaneously displays other field and farm enterprise information (e.g., weather, agronomic recommendations). In such embodiments, the values may be displayed in a single window displayed by the display device alongside the other information. The processing system 120 preferably determines the field stage of the field and displays only the map corresponding to the field stage. The interface may determine the field stage based on a user input or other information related to the field. For example, in response to a user input indicating that a field has been planted, the display device may display the value of map 600 instead of the value of map 500. As an additional example, when the display device determines that a value of 100% has been reached by one or more fields in the growth stage, the display device may begin to display value of the map 700 instead of the value of the map 600. Thus as the growing season progresses, the display device preferably updates the field stage value displayed according to the field stage of the fields shown on the display device. The display device may display the map corresponding to at least one, a majority, or all of the fields within the map area.

Figure 8:
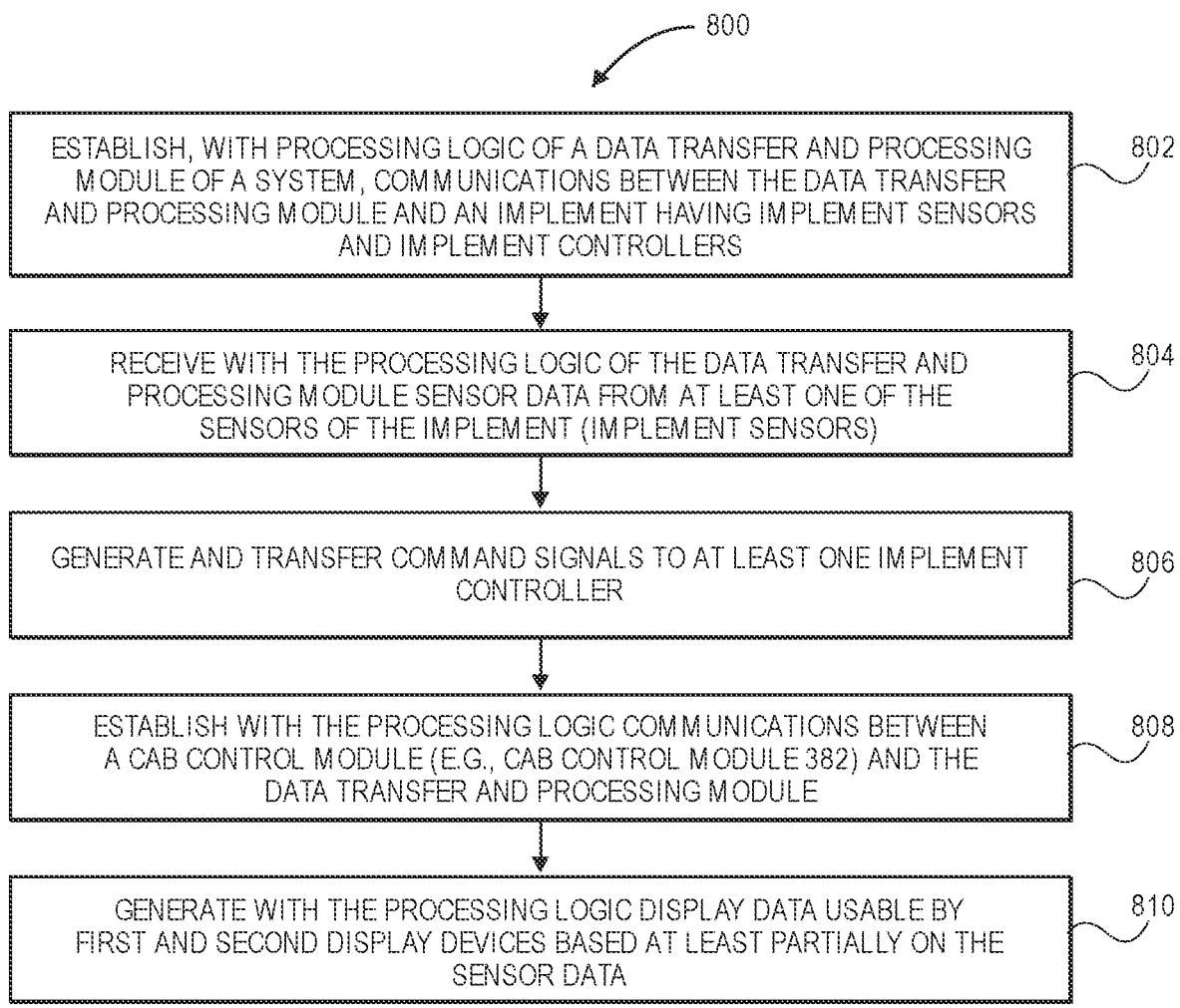
FIG. 8 illustrates a flow diagram of one embodiment for a method 800 of operating a system having a data transfer and processing module for field operations including planting or harvesting operations.

FIG. 8 illustrates a flow diagram of one embodiment for a method 800 of operating a system having a data transfer and processing module (or data transfer and processing module in combination with an extension module) for field operations including planting or harvesting operations. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic of at least one data processing system (e.g., processing system of a planter, processing system of a combine, processing system of a machine). The data processing system includes a data transfer and processing module (e.g., data transfer and processing module 122, 222, 322), an extension module 380, or other electronic device that executes instructions of a software application or program with processing logic. The software application or program can be initiated by an operator or user of a machine (e.g., tractor, combine) that is communicating with an implement (e.g., planter, cultivator, plow, spreader, etc.).

In one embodiment, at block 802, processing logic of a data transfer and processing module of a system establishes communications between the data transfer and processing module and an implement having implement sensors and implement controllers. At block 804, the processing logic receives, with the data transfer and processing module, sensor data from at least one of the sensors of the implement (implement sensors). At block 806, the processing logic generates and transfers command signals to at least one implement controller. At block 808, the processing logic establishes communications between a cab control module (e.g., cab control module 382) and the data transfer and processing module. The cab control module may include a user interface configured to receive implement controller commands from a user. The cab control module is configured to transmit command signals to the implement controllers.

At block 810, the processing logic generates display data useable by first and second display devices based at least partially on the sensor data. The display data may also be based on other data (e.g., data received from the controllers). In one example, the data transfer and processing module does not include a graphical user interface. In another example, the first display device includes a multi-function consumer tablet computing device. The second display device may be a dedicated implement monitoring device.

In one embodiment, the implement sensors include a plurality of seed sensors. The implement controllers include a plurality of seed meter drive motors.

In one embodiment, a system (e.g., system 104, 204, 304) for monitoring and controlling an agricultural implement includes a data transfer and processing module (e.g., data transfer and processing module 122, 210, 322). This module includes a first connector (e.g., connector 250, 350) that is configured to communicate with a plurality of implement sensors and to receive sensor data from the plurality of implement sensors. A second connector (e.g., connector 251, 351) is configured to communicate bi-directionally with a plurality of implement controllers. A first port (e.g., port 260) is configured to communicate bi-directionally with a first display device. A second port (e.g., port 263) is configured to communicate with a second display device. In one example, a processing system (e.g., processing system 120, 220, 320) is coupled to the first connector, the second connector, the first port, and the second port. The processing system is configured to process sensor data received from the plurality of implement sensors. The processing system is also configured to generate and transfer command signals to said plurality of implement controllers. The processing system is also configured to generate display data useable by said first and second displays.

In one example, the data transfer and processing module does not include a graphical user interface. In another example, the first display device includes a multi-function consumer tablet computing device and the second display device includes a dedicated implement monitoring device.

In one example, the plurality of implement sensors includes a plurality of seed sensors and the plurality of implement controllers includes a plurality of seed meter drive motors.

In one example, the data transfer and processing module further includes an authentication device configured to authenticate and permit communication with at least one of said first display device and said second display device.

In another example, the first connector is configured to receive data from a first implement bus and the second connector is configured to receive data from a second, different implement bus. The data transfer and processing module may further include a third port that is configured to communicate with a third display device.

In another embodiment, the data transfer and processing module further includes a power over ethernet injector (e.g., PoE 368) in communication with said first and second ports.

The system may further include a cab control module (e.g., cab control module 382) in data communication with data transfer and processing module. The cab control module may include a user interface that is configured to receive implement controller commands from a user. The cab control module is configured to transmit command signals to said plurality of implement controllers.

It is to be understood that the above description is intended to be illustrative, and not restrictive. Many other embodiments will be apparent to those of skill in the art upon reading and understanding the above description. The scope of embodiments of the invention should, therefore, be determined with reference to the appended claims, along with the full scope of equivalents to which such claims are entitled.

What is claimed is:

1. A system for monitoring an agricultural implement, comprising:
   a data transfer and processing module configured to communicatively couple with a plurality of implement sensors and at least one removable display device;
   an authentication device configured to provide authentication between the data transfer and processing model and a particular removable display device, wherein when the particular removable display device is authenticated, the particular removable display device transmits and receives data to and from the data transfer and processing module; and
   one or more non-transitory computer-readable storage media in the data transfer and processing system, and storing one or more sequences of instructions which when executed using one or more processors cause:
      the data transfer and processing module to process sensor data and to generate data for display on the particular removable display device; and
      the data transfer and processing module to receive input data from the particular removable display device to control field operations.

2. The system of claim 1, wherein when the removable display device is authenticated, an implement display device of the agricultural implement and the removable display device are synchronized.

3. The system of claim 1, wherein the plurality of implement sensors comprises one or more of seed sensors, moisture sensors, yield sensors, speed sensors, downforce sensors, or liquid application sensors.

4. The system of claim 1, wherein sensor data comprises observations of one or more of soil observations, planting observations, irrigation observations, geo-location observations, or weather observations.

5. The system of claim 1, wherein the data transfer and processing module is configured to couple with a plurality of implement controllers.

6. The system of claim 5, wherein the input data from the particular removable display device controls one or more of the plurality of implement controllers.

7. The system of claim 1, wherein the data for display includes a field region report related to agricultural practices.

8. The system of claim 1, wherein the removable display device is a mobile computing device.

9. A method for monitoring an agricultural implement, comprising:
   receiving sensor data from a plurality of implement sensors;
   authenticating a removable display device; and
   based on the removable display device being authenticated,
      processing the sensor data to generate data for display on the removable display device, and
      receiving input data from the removable display device to control field operations.

10. The method of claim 9, further comprising based on the removable display device being authenticated, synchronizing an implement display device of the agricultural implement and the removable display device.

11. The method of claim 9, wherein the plurality of implement sensors comprises one or more of seed sensors, moisture sensors, yield sensors, speed sensors, downforce sensors, or liquid application sensors.

12. The method of claim 9, wherein sensor data comprises observations of one or more of soil observations, planting observations, irrigation observations, geo-location observations, or weather observations.

13. The method of claim 9, further comprising coupling a plurality of implement controllers.

14. The method of claim 13, wherein the input data from the removable display device controls one or more of the plurality of implement controllers.

15. The method of claim 9, wherein the data for display includes a field region report related to agricultural practices.

16. The method of claim 9, wherein the removable display device is a mobile computing device.

17. One or more non-transitory computer-readable storage media storing one or more instructions programmed for monitoring an agricultural implement, which, when executed by one or more computing devices, cause the one or more computing devices to perform the steps of:
   receiving sensor data from a plurality of implement sensors;
   authenticating a removable display device; and
   when the removable display device is authenticated,
      processing the sensor data to generate data for display on the removable display device, and
      receiving input data from the removable display device to control field operations.

18. The one or more non-transitory computer-readable storage claim 17, wherein the one or more instructions, which, when executed by the one or more computing devices, further cause the one or more computing devices to perform the step of: when the removable display device is authenticated, synchronizing an implement display device of the agricultural implement and the removable display device.

19. The one or more non-transitory computer-readable storage claim 17, wherein the one or more instructions, which, when executed by the one or more computing devices, further cause the one or more computing devices to perform the step of: coupling a plurality of implement controllers, wherein the input data from the removable display device controls one or more of the plurality of implement controllers.

20. The one or more non-transitory computer-readable storage claim 17, wherein the removable display device is a mobile computing device.

* * * * *